(12) United States Patent
Bolaski

(10) Patent No.: US 6,722,385 B1
(45) Date of Patent: Apr. 20, 2004

(54) HYDRAULIC VALVE REPAIR KIT AND METHOD OF USE

(75) Inventor: Lawrence P. Bolaski, Rockingham, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 44 days.

(21) Appl. No.: 10/229,896

(22) Filed: Aug. 29, 2002

Related U.S. Application Data

(60) Provisional application No. 60/318,954, filed on Sep. 14, 2001.

(51) Int. Cl.[7] ............................................. F15B 13/042
(52) U.S. Cl. ................. 137/15.17; 137/15.19; 137/315.09; 137/625.66
(58) Field of Search .......................... 137/15.17, 15.19, 137/315.09, 625.66

(56) References Cited

U.S. PATENT DOCUMENTS 6,543,472 B2 * 4/2003 Stafford .................. 137/454.2
6,585,002 B2 * 7/2003 Stafford ...................... 137/539

* cited by examiner

*Primary Examiner*—Gerald A. Michalsky
(74) *Attorney, Agent, or Firm*—Clifford F. Rey

(57) ABSTRACT

A hydraulic spool valve repair kit comprising a cylindrical valve cap and a replacement spring retainer plate and a method of use of these components for increasing the service longevity of such a hydraulic spool valve within the valve body of an automatic transmission is disclosed. The present valve cap is a cylindrical steel construction having a longitudinal bore, which is radially disposed about a terminal end of the aluminum valve piston to provide a more durable contact surface and to substantially reduce mechanical wear between the dissimilar materials of the original components. The replacement spring retainer plate, which inadvertently contacts the valve piston under some operating conditions, is reconfigured to include resilient leg members for retention of the spring retainer plate within the valve body and also provides a stable spring seat for the compression spring that actuates the spool valve.

16 Claims, 5 Drawing Sheets

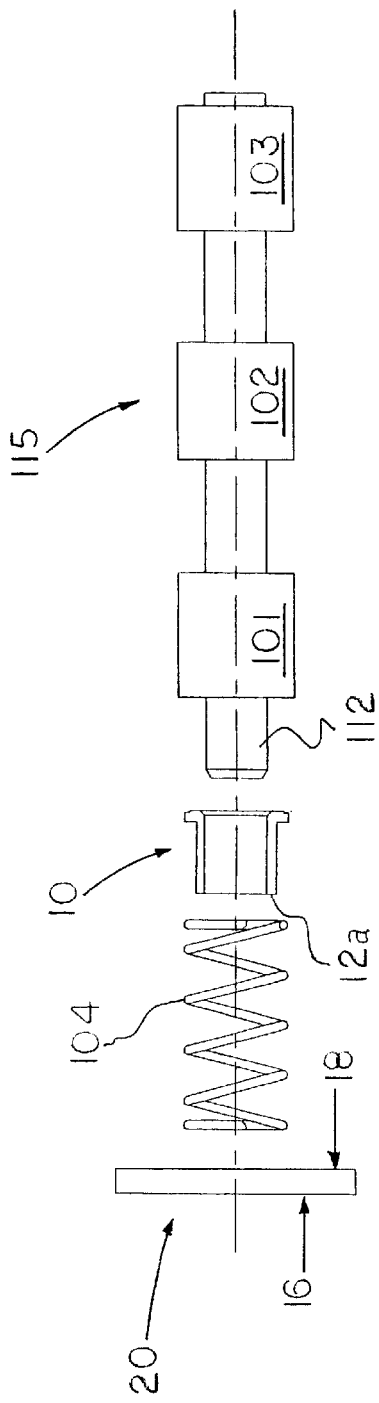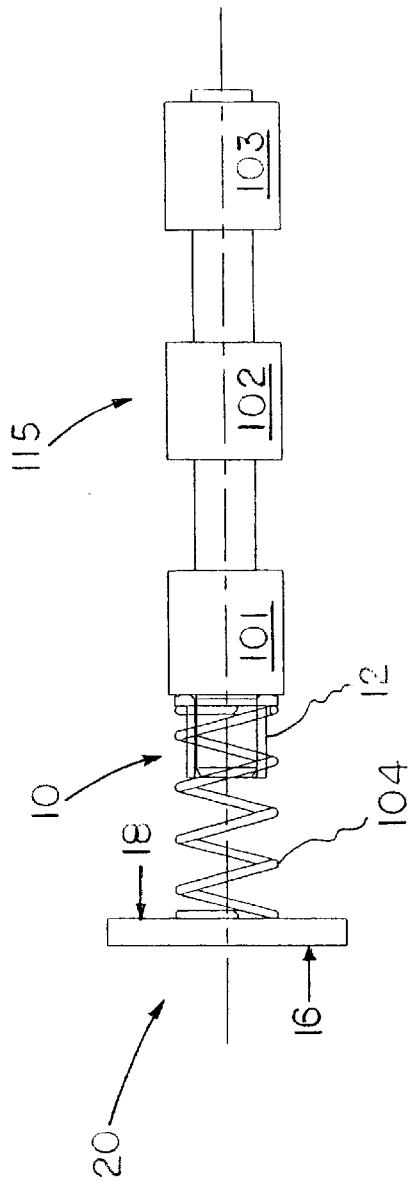
FIG. 3A
FIG. 3B

HYDRAULIC VALVE REPAIR KIT AND METHOD OF USE

CROSS-REFERENCE TO RELATED APPLICATION

This patent application claims the benefit under 35 U.S.C. §119(e) of U.S. Provisional Patent Application No. 60/318,954 filed Sep. 14, 2001 entitled Valve Saver Kit.

BACKGROUND OF INVENTION

The present invention relates to automatic transmissions and, more particularly, to a hydraulic valve repair kit and method of use, which functions to extend the useful service life of a hydraulic spool valve within the valve body of a transmission.

Automatic transmission systems of the prior art have a hydraulic circuit sub-system which includes at least a hydraulic pump, a valve body having fluid conducting passages or circuits, input and exhaust ports formed within the fluid circuits, and a plurality of spool valves so-called because of their resemblance to sewing thread type spools. Such valves are comprised of cylindrical pistons having control diameters or lands formed thereon, which alternately open and close the ports to the fluid circuits to regulate the flow and pressure of automatic transmission fluid (hereinafter "ATF") within the fluid circuits to actuate different components of the transmission. It will be understood that in describing hydraulic circuits, ATF usually changes names when it passes through an orifice or control valve in a specific fluid circuit.

Typically such a spool valve undergoes continuous reciprocating movement due to fluctuation in hydraulic line pressure, which can result in premature wear and improper shifting problems in the transmission. More particularly, the end faces of such a spool valve can be damaged by continuous striking against the interior of the valve body and other internal components such a spring retainer plate during operation resulting in jamming and failure of the hydraulic circuit requiring complete transmission overhaul.

Thus, the present invention has been developed to resolve this problem and other shortcomings of the prior art.

SUMMARY OF THE INVENTION

Accordingly, the present invention is a spool valve repair kit comprising a valve cap and a replacement spring retainer plate, which are utilized in combination to repair the original equipment manufacture (hereinafter "OEM") spool valve to increase the service longevity of such a spool valve in the valve body of an automatic transmission. The valve cap is a cylindrical construction, which is radially disposed about a terminal end of the valve piston to provide a durable contact surface for the valve piston. The spring retainer plate is also redesigned to prevent damage to the aformentioned contact surface and to provide a stable spring seat for a compression spring, which improves the accuracy of the valve's operation.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

FIG. 3A is an exploded elevational view of the spool valve assembly of FIG. 2 showing the valve cap and spring retainer plate of the present valve saver kit;

FIG. 3B is an elevational view of the spool valve assembly of FIG. 3A showing the components of the present valve saver kit installed in their functional positions;

DETAILED DESCRIPTION OF THE PREFERRED EMBODIMENTS

Figure 1:
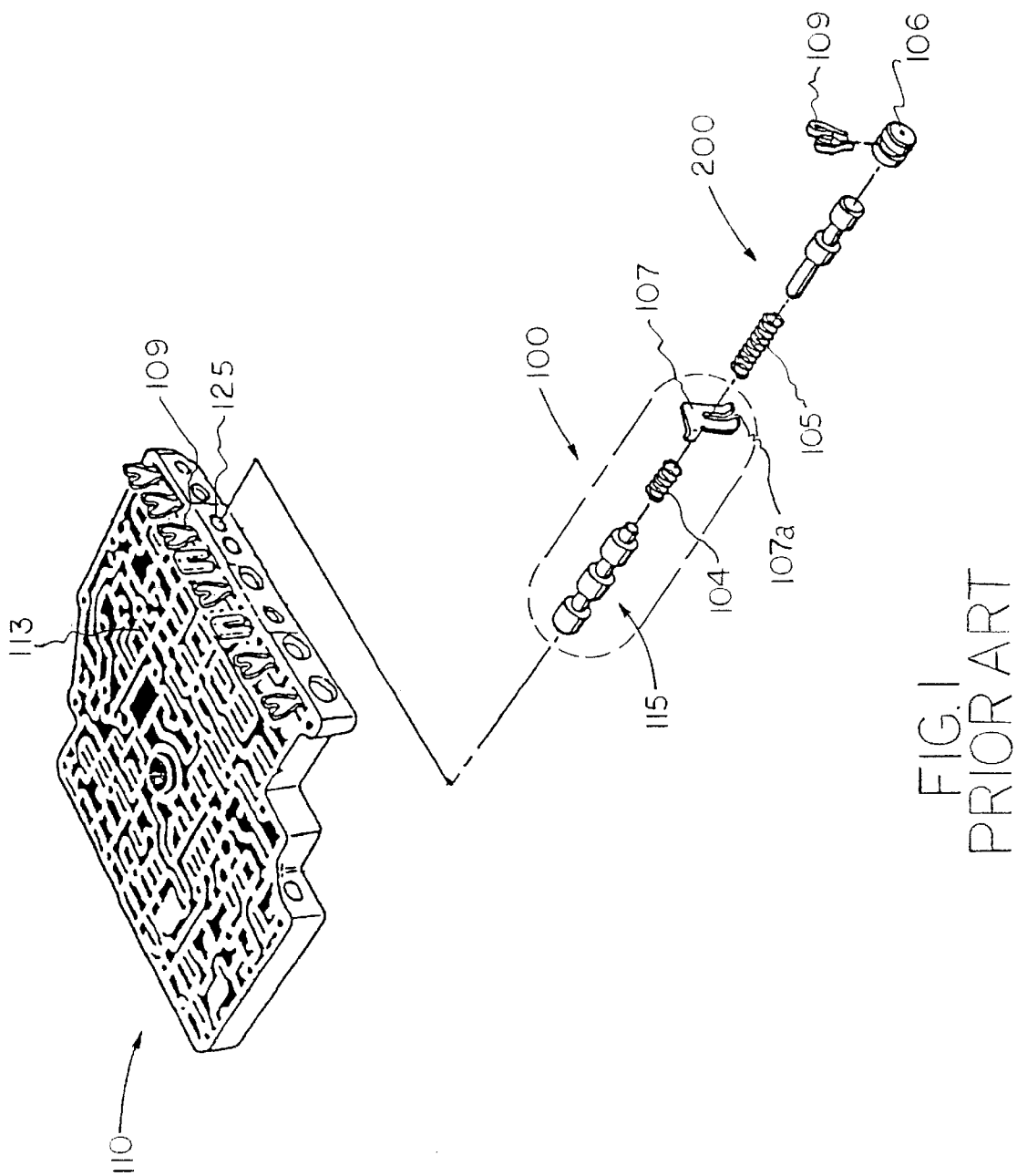
FIG. 1 is a perspective view of the valve body of a Ford AXODE transmission illustrating an exploded view of a spool valve assembly wherein the present valve saver kit is to be utilized and being labeled Prior Art.

With further reference to the drawings there is shown therein an OEM spool valve assembly of the prior art, indicated generally at 100, and illustrated in FIG. 1. It will be noted that in the embodiment illustrated, two separate OEM spool valve assemblies 100, 200 are arranged in coaxial relation for control of separate hydraulic circuits. The prior art spool valve assemblies 100, 200 are shown in exploded view and removed from their functional position within a mating bore 125, which is machined into the valve body, indicated generally at 110, of a Ford AXODE transmission. For purposes of this application the term "spool valve" is used generically to apply to all hydraulic valves of this general type as described hereinafter in further detail.

As more clearly shown in FIG. 2, the spool valve assembly 100 includes a generally cylindrical piston 115 having a plurality of control lands or spools 101, 102, 103 formed thereon, which function to regulate the flow of automatic transmission fluid (hereinafter "ATF") within the valve chamber defined by the stem portions 108 and the surrounding bore 125 (FIG. 1). The valve piston 115 also includes a coaxial spring guide diameter 112 of a sufficient size to support a compression spring 104 having a spring rate and operating characteristics suited to this application. The OEM valve piston 115 is fabricated from an aluminum material.

Figure 2:
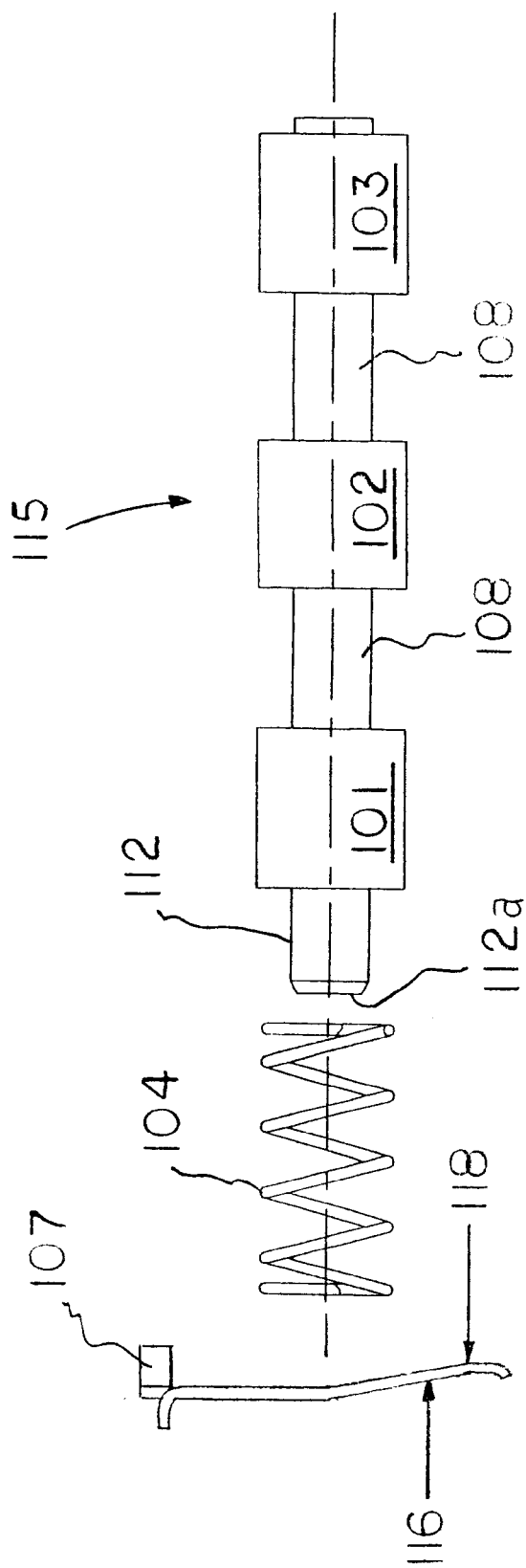
FIG. 2 is an exploded elevational view of the spool valve assembly of FIG. 1.

The OEM spring retainer plate 107 as seen in FIG. 2 is inserted into the valve body 110 to separate the valve assemblies 100, 200 and functions as a seating surface for the spring 104 and often as an unintended stop surface for the terminal end face 112a of the spring guide diameter 112, which is known to strike the steel spring retainer plate 107 in operation causing physical damage to the terminal end face of the spring guide diameter.

The OEM retainer plate 107 is constructed of spring steel and is slightly bent along its length as shown, which provides a gripping effect when it is installed in a mating slot in the valve body 110 in a known manner. However, this design produces dissimilar surfaces as at 116, 118, whereon the respective springs 104, 105 of valve assemblies 100, 200 are seated in operation (FIG. 1), which are not perpendicular to the longitudinal axis —A—of the valve assemblies 100, 200. This produces slight differences in the compression and expansion of the springs 104, 105 which can affect performance of the valve assemblies 100, 200.

An OEM end plug 106 and retaining clip 109 (FIG. 1) serve to retain the valve assemblies 100 and 200 in their functional positions within the bore 125 of the valve body 110.

In operation ATF is delivered via hydraulic circuits formed in the valve body 110 into the valve chamber defined by the stem portions 108 of the valve piston 115 and the surrounding bore 125 and then passes into the hydraulic circuits controlled by the valve assemblies 100, 200. If the fluid pressure within such hydraulic circuits exceeds the maximum limits for the Ford AXODE transmission, the ATF pressure acts against the force of the spring 104 to deflect or stroke the valve piston 115 such that the spools 101, 102, 103 close the valve. This reciprocating motion of the valve piston 115 is repeated as often as required to maintain ATF line pressure in the controlled circuits within predetermined limits for the transmission.

In the Ford AXODE transmission the reciprocating motion of the valve piston 115 causes repeated impacts of the end face 112a of the spring diameter 112 against the OEM spring retainer plate 107. This results in premature wear and eventually causes mechanical damage and/or jamming of the spring guide diameter 112 within the slot 107a (FIG. 1) of the retainer plate 107 resulting in malfunction of the so-called Pull-In Control circuit and corresponding 3rd/$2^{nd}$ gear shift timing problems, which are well known deficiencies of this transmission.

Thus, the present invention has been developed to resolve this problem and will now be described. With reference to FIGS. 3A and 3B the present valve saver kit is comprised of a generally cylindrical valve cap, indicated generally at 10, and a modified spring retainer plate, indicated generally at 20. In one embodiment, among others, the valve cap 10 is fabricated of low carbon steel or other suitable material and dimensioned to a sliding fit condition with the spring guide diameter 112 of the OEM valve piston 115. In the completed assembly valve cap 10 is disposed within the OEM spring 104 as shown in FIG. 3B. The present spring retainer plate 20 is designed as a direct replacement for the OEM retainer plate 107.

Figure 4A:
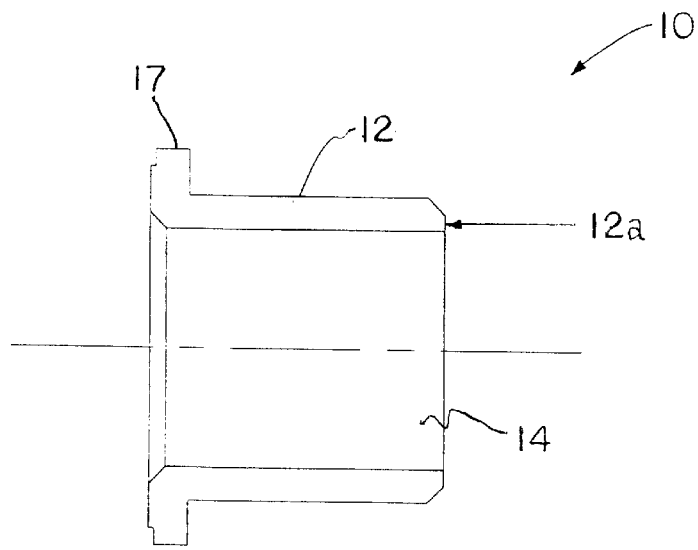
FIG. 4A is an enlarged cross-sectional view of the valve cap of the present valve saver kit.
Figure 4B:
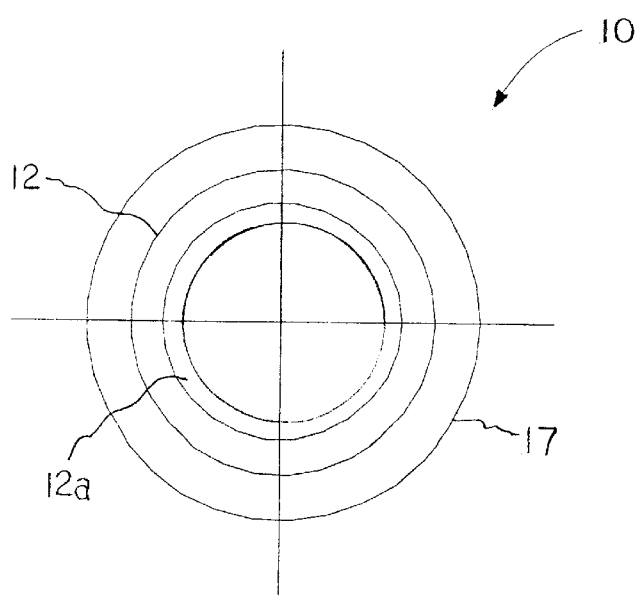
FIG. 4B is a right end view of the valve cap shown in FIG. 4A.

The present invention provides structures comprising wear-reducing means including, but not limited to, the following structures. As shown in FIGS. 4A and 4B the valve cap 10 is a generally cylindrical component designed to reduce frictional wear on spring guide diameter 112. The present valve cap 10 includes a spring locating diameter 12 formed about a longitudinal bore 14, which is dimensioned to a close-tolerance, slip fit condition with the OEM spring guide diameter 112. The valve cap 10 also includes a flange 17 formed in perpendicular relation to spring guide diameter 12, which functions as a seat for the OEM spring 104.

Figure 5A:
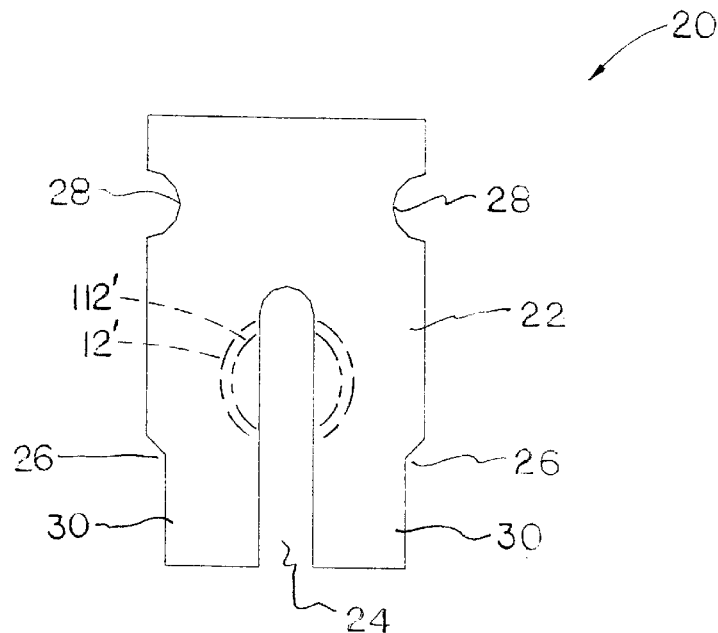
FIG. 5A is a front elevational view of the spring retainer plate of the present valve saver kit showing the relative position of the installed valve cap in phantom outline.
Figure 5B:
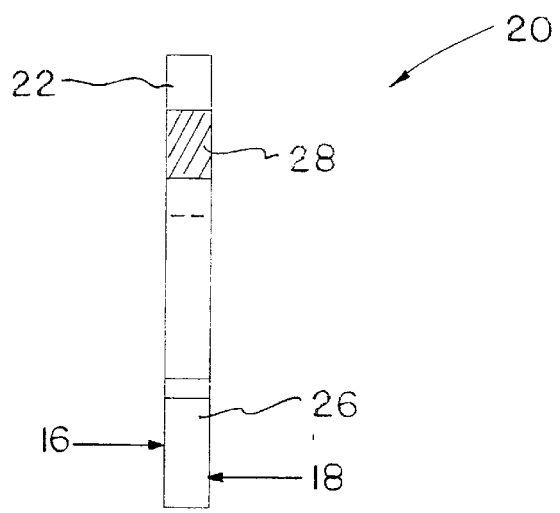
FIG. 5B is a side elevational view of the spring retainer plate shown in FIG. 5A.

Referring to FIGS. 5A and 5B there is shown therein the modified spring retainer plate 20 in accordance with the present invention. Retainer plate 20 is comprised of a body member 22 including a central slot 24 formed along the longitudinal centerline thereo, which defines a pair of opposed leg members 30. Slot 24 imparts resiliency to leg members 30 permitting inward compression thereof during installation and providing an outward spring bias to the leg members to retain the spring retainer plate 20 within the valve body 110.

The terminal ends of leg members 30 are relieved along the lateral aspects thereof as at 26 to provide adequate clearance with the sidewalls and corners of the hydraulic passage as at 113 (FIG. 1) within the valve body 110 wherein the retainer plate 20 is installed. It will be noted that the opposed front and back surfaces 16, 18 of the body member 22 are parallel as shown in FIG. 5B (in contrast to the curved surfaces 116, 118 of the OEM spring retainer plate 107) such that the compression springs 104, 105 are seated squarely in perpendicular relation thereto for optimal accuracy of the valve assemblies 100, 200 in operation. Semicircular notches 28 formed in the body member 22 provide grasping points for a retainer plate removal tool (not shown).

In practical use the present valve saver kit including the valve cap 10 and the spring retainer plate 20 are installed as shown in FIG. 3B. The valve cap 10 is dimensioned to a slip fit condition with the OEM spring guide diameter 112 and abuts the first adjacent spool diameter 101. Once installed as shown, it will be noted that the axial length of spring locating diameter 12 is at least equal to or slightly exceeds the axial length of the OEM spring guide diameter 112. Thus, the end face 12a of the valve cap 12 makes direct contact with surface 18 of the spring retainer plate 20.

Because both valve cap 12 and spring retainer plate 20 are constructed of steel material there is less mechanical wear at the interface of contact surfaces 12a and 18 than in the OEM design wherein dissimilar materials (i.e. aluminum valve piston 115 and steel retainer plate 107) are in direct mechanical contact. Further, the valve cap 10 prevents spring guide diameter 112 from becoming jammed within the central notch 24 of the present retainer plate 20, which is a common service problem in the Ford AXODE transmission. That is, the spring locating diameter 12 of the valve cap 10 provides more cross-sectional contact area during operation than the spring guide diameter 112 and, thus, has less tendency for becoming jammed as illustrated in comparison view by phantom outlines 12', 112' in FIG. 5A.

Thus, it can be seen that the present valve saver kit provides a simple and cost effective repair kit to increase the service longevity of a hydraulic spool valve by preventing premature wear and mechanical damage resulting from the repeated impact of an aluminum spool valve and a steel spring retainer plate being fabricated from dissimilar materials.

Further, the increased diameter and cross-sectional surface area of the present valve cap provides a valve piston which is less likely to become jammed within the central slot of the mating spring retainer plate causing improper 3/2 shifting and Pull-In Control circuit failure, which are deficiencies commonly associated with the Ford AXODE transmission.

Although the present invention has been developed to resolve a common deficiency associated with the Ford AXODE transmission, it will be appreciated by those skilled in the art that the present valve saver kit has broad application to spool valves in other automotive transmissions and the embodiments described herein are intended as merely illustrative and not restrictive in any sense.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A hydraulic valve repair kit for use in combination with a hydraulic valve assembly disposed within the valve body of an automatic transmission, wherein the valve assembly comprises a valve piston having a plurality of control diameters and a coaxial spring guide diameter formed thereon, a compression spring disposed on the spring guide diameter, and a spring retainer plate, said valve piston being spring-biased to an open position and being axially moveable to a closed position responsive to a predetermined maximum fluid pressure, said valve repair kit comprising:

a replacement spring retainer plate installed within the valve body adjacent the spring guide diameter and functioning as a seating surface for the compression spring; and a cylindrical valve cap having a longitudinal bore, said valve cap having a spring locating diameter of a predetermined axial length equal to the axial length of the spring guide diameter, said valve cap being radially disposed about the spring guide diameter and intermediate the spring guide diameter and the compression spring, said valve cap serving as a wear surface for contact with said replacement spring retainer plate in operation thereby preventing mechanical damage to the spring guide diameter.

2. A hydraulic valve repair kit of claim 1 wherein said valve cap includes a cylindrical flange member integrally formed at a first end thereof in perpendicular relation to said bore, said flange member abutting a first control diameter adjacent the spring guide diameter and functioning as a seating surface for the compression spring.

3. A hydraulic valve repair kit of claim 1 wherein said replacement spring retainer plate comprises a generally rectangular body member having parallel top and bottom surfaces, parallel side edges and parallel end surfaces, said body member further including a central slot formed on the longitudinal centerline thereof and extending to a first end surface thereof, wherein said slot defines a pair of symmetrical leg members integrally formed with said body member, said slot imparting resiliency to said leg members such that installation of said spring retainer plate within said valve body imparts an outward spring bias to said leg members.

4. A hydraulic valve repair kit of claim 3 wherein said body member further includes a pair of semicircular cutouts formed in said opposite side edges thereof providing grip points for an installation tool.

5. A hydraulic valve repair kit of claim 1 wherein said valve cap and said replacement spring retainer plate are both fabricated from low carbon steel to reduce mechanical wear at the interface thereof.

6. A hydraulic valve assembly for use within the valve body of an automatic transmission, said hydraulic valve assembly comprising:

a valve piston including a plurality of concentric control diameters and a concentric spring guide diameter formed thereon, said valve piston being spring-biased to an open position and being axially moveable to a closed position responsive to a predetermined maximum fluid pressure;

a compression spring disposed on said spring guide diameter, said compression spring being seated against a spring retainer plate disposed within the valve body; and wear reducing means disposed on said spring guide diameter for preventing mechanical damage to said spring guide diameter due to contact with the spring retainer plate in operation.

7. A hydraulic valve assembly of claim 6 wherein said wear reducing means includes at least one cylindrical valve cap having a longitudinal bore, said valve cap including a spring locating diameter of a predetermined axial length equal to the axial length of said spring guide diameter, said valve cap being radially disposed about the spring guide diameter and further disposed intermediate the spring guide diameter and the compression spring, said valve cap serving as a wear surface for contact with the spring retainer plate thereby preventing mechanical damage to the spring guide diameter in operation.

8. A hydraulic valve assembly of claim 7 wherein said valve cap includes a cylindrical flange member integrally formed at a first end of said spring locating diameter in perpendicular relation thereto, said flange member abutting a first control diameter adjacent said spring guide diameter and serving as a seating surface for said compression spring.

9. A hydraulic valve assembly of claim 8 wherein said valve cap is fabricated from low carbon steel to reduce mechanical wear at the interface of said spring guide diameter and the spring retainer plate.

10. An improved spool valve assembly for use within the valve body of an automatic transmission, said spool valve assembly comprising a valve piston having a plurality of spool diameters and a coaxial spring guide diameter formed thereon, and a compression spring disposed on the spring guide diameter and seated against an adjacent spring retainer plate, said valve piston being spring-biased to an open position and being axially moveable to a closed position responsive to a predetermined maximum fluid pressure, wherein the improvement comprises:

wear reducing means disposed on said spring guide diameter for preventing mechanical damage to said spring guide diameter due to contact with the spring retainer plate in operation.

11. An improved spool valve assembly of claim 10 wherein said wear reducing means comprises:

a cylindrical valve cap having a longitudinal bore, said valve cap including a coaxial spring locating diameter of a predetermined axial length equal to the axial length of said spring guide diameter, said valve cap being radially disposed about said spring guide diameter and intermediate said spring guide diameter and said compression spring to provide a wear surface for contact with the spring retainer plate in operation thereby preventing mechanical damage to said spring guide diameter.

12. An improved spool valve assembly of claim 11 wherein said valve cap includes a cylindrical flange member integrally formed at a first end of said spring locating diameter in perpendicular relation thereto, said flange member abutting a first spool diameter adjacent said spring guide diameter and serving as a seating surface for said compression spring.

13. An improved spool valve assembly of claim 12 wherein said valve cap is fabricated from low carbon steel material to reduce frictional wear at the contact interface with the spring retainer plate.

14. A method of installing a hydraulic valve repair kit within the valve body of a transmission to prevent mechanical damage to a hydraulic valve assembly of the type comprising a valve piston having a plurality of spool diameters and a coaxial spring guide diameter formed thereon and a compression spring disposed on the spring guide diameter and seated against an adjacent spring retainer plate, said valve assembly being retained within said valve body by an end plug and a retaining clip, said method comprising the steps of:

removing the original equipment hydraulic valve assembly including the compression spring and the spring retainer plate from the valve body;

providing a cylindrical valve cap of a predetermined axial length equal to the axial length of said spring guide diameter including a flange member integrally formed at a first end thereof;

inserting a replacement spring retainer plate having a central slot defining a pair of resilient leg members into said valve body;

sliding said valve cap onto said spring guide diameter until said flange member abuts a first spool diameter;

positioning said compression spring about said valve cap such that said spring guide diameter, said valve cap, and said spring are arranged in coaxial relation; and installing said hydraulic valve assembly within said valve body such that said compression spring is disposed intermediate said spring retainer plate and said flange member.

15. The method of claim 14 wherein the step of inserting further includes the step of:

compressing said resilient leg members inwardly during installation thereby imparting an outward spring bias to said leg members to retain said replacement spring retainer plate in said valve body.

16. The method of claim 15 wherein the step of installing further includes the steps of:

replacing the original end plug and retaining clip to retain said hydraulic valve assembly in the valve body.

* * * * *